United States Patent
Smith Jr. et al.

[15] 3,646,309
[45] Feb. 29, 1972

[54] SELF-ADAPTIVE WELDING TORCH CONTROLLER

[72] Inventors: Carl M. Smith, Jr., Knoxville; William R. Miller, Oak Ridge, both of Tenn.

[73] Assignee: The United Slates of America as represented by the United States Aomic Energy Commission

[22] Filed: Jan. 26, 1971

[21] Appl. No.: 109,867

[52] U.S. Cl. ............................219/125 PL, 219/60, 219/79, 219/130, 318/576
[51] Int. Cl. ................................................B23k 9/12
[58] Field of Search..................219/125 PL, 124, 125 R, 60, 219/61, 130, 137, 73, 76; 318/576; 324/37, 40

[56] References Cited

UNITED STATES PATENTS

| | | | |
|---|---|---|---|
| 2,839,663 | 6/1958 | McCollom | 219/125 R X |
| 3,217,204 | 11/1965 | Nance | 219/125 PL X |
| 3,341,686 | 9/1967 | Sidbeck | 219/130 |
| 3,346,807 | 10/1967 | Wood et al. | 324/37 |
| 3,571,557 | 3/1971 | Valentine | 219/124 |

Primary Examiner—J. V. Truhe
Assistant Examiner—L. A. Schutzman
Attorney—Roland A. Anderson

[57] ABSTRACT

A fully automatic, self-adaptive welding system has been provided for programmed welding applications. The welding torch position, either vertically or horizontally, is generally responsive to a signal proportional to the work-to-torch spacing as well as certain other signals including pulses used to control the oscillation of the torch across the weld area. Control of the torch oscillation is, in part, supplied by the spacing signal. Use of the system ensures welds of high quality as to weld tie-in, conformity to vertical or horizontal irregularities in the parts, and thickness.

8 Claims, 5 Drawing Figures

INVENTORS.
Carl M. Smith, Jr.
William R. Miller
BY

ATTORNEY.

SELF-ADAPTIVE WELDING TORCH CONTROLLER

BACKGROUND OF THE INVENTION

The present invention was made during the course of, or under, a contract with the United States Atomic Energy Commission.

This invention relates generally to control systems for welding apparatus, and more particularly to a control system for automatic, self-adaptive control of a welding torch in response to a signal proportional to the work-to-torch spacing.

In the art of tungsten inert gas welding, significant improvements have been made which provide consistently high-quality welds with a minimum of operator control. Two developments of particular importance are those described in U. S. Pat. Nos. 2,360,160 issued Oct. 10, 1944, to Pickhaver and U.S. Pat. No. 3,341,686 issued Sept. 12, 1967, to Sidbeck. In these patents, fluctuations in the value of the arc voltage are used to continuously adjust the electrode-to-work spacing and the weld filler metal feed rate, respectively.

Machines employing these prior art systems satisfactorily prepare welds of a routine type when standard components are to be welded and in applications where operator control can be exercised if necessary. However, the control of welding is not adequate in applications where nonuniformity of surfaces exist and where completely remote welding operations must be conducted, as is in the repair of nuclear reactor systems. When using the system of the above-referenced U.S. Pat. No.3,341,686, an arc voltage increase indicating, for example, a low area on the substrate, produces an increase in the wire feed rate. However, since the weld arc cone spreads with increased voltage, there is no increase in energy applied at the weld and the surface of the weld tends to become convex due to the extra filler wire. This bead convexity has resulted in "cold laps" in the weld where multiple passes are utilized. Also, large variations in bead cross section due to the convexity makes the proper deposition of subsequent filler passes more difficult.

In the case of continuous control of electrode-to-work spacing (U.S. Pat. No. 3,360,160) abrupt changes in the elevation of a previously placed filler pass or welding insert, for example, either causes oscillation in the control if too rapid response is planned or electrode "stubbing" if the response is too slow. Either case produces an undesirable weld, particularly for reactor application.

Further, it is well recognized in the art of automatic welding that it is necessary to provide controlled oscillation of the torch tip across a weld joint together with the above-mentioned controls in order to provide consistent weld path width and deposition consistent with the configuration of a particular joint groove between the workpieces being welded. Although various control means have been provided in the past for controlling the oscillator motion of the torch tip relative to the groove path in automatic welding systems, these systems have been complicated by the fact that the oscillator motion was controlled by separate means which have not been particularly interrelated with the torch-to-workpiece spacing control. Therefore, some separate control means must be provided to not only control the magnitude of oscillatory motion of the tip consistent with the weld path width, but to also provide means for maintaining the torch centered over the weld path.

Programmed welding systems have been provided to control the movement of the torch carriage or the workpiece along a prescribed path for production setups in welding uniform parts. This particular mode of operation is not readily applicable for remote automatic welding systems in, for example, nuclear reactor maintenance, because it requires extremely accurate edge preparation of the work parts in assembled relationship relative to the path of travel of the welding assembly.

Other methods of control utilize automatic seam followers which have sensing coils for electromagnetically following a seam between work parts. This system requires the application of magnetic fields along the scan path which is generally unsuited to nuclear plant materials and conditions.

Neither of the above systems provide the control sensitivity and simplicity which are required for automatic remote welding applications. Accordingly, it will be seen that there is a need for a fully automatic and self-adaptive welding system for programmed welding applications which is simple to operate and maintain.

SUMMARY OF THE INVENTION

The subject invention may be summarized as an adaptive control system, which may be used in combination with the prior art filler wire control welding system, wherein vertical spacing and horizontal oscillatory movements of the welding torch are so interrelated that complete control of the welding process by the circuit produces the highest quality of weld. The oscillatory movement of the torch tip is controlled by registering a predetermined number of fixed period pulses from the time the torch tip moves past the particular weld pass center position toward a wall of the weld groove. The tip is then reversed to move toward the other wall of the weld groove in the same manner. The movement may be inhibited by the torch-to-work spacing signal if a preset value is reached before the complete count is registered, thereby preventing stubbing of the torch tip due to perturbations in the groove wall.

It is therefore an object of this invention to provide a completely automatic, self-adaptive welding system for remote programmed welding applications.

It is another object of this invention to provide a system that will produce satisfactory welds even if horizontal deviations are encountered in the weld pass, as in contour welding.

Other objects and many of the attendant advantages of the present invention will be apparent from the following detailed description.

DETAILED DESCRIPTION

The inventive concept in this case may be used in progressive fusion electrical arc welding either in a relatively straight path as required to join two flat plates or in a circumferential path as required to join the abutted ends of two tubular conduit sections.

Figure 2:
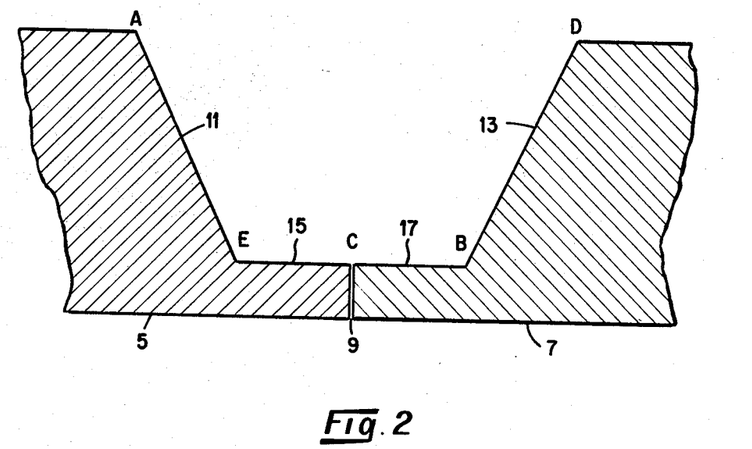
FIG. 2 is a fragmentary cross-sectional view of one type of weld joint for illustrating the operation of the subject invention.

Referring now to FIG. 2, a typical joint to be welded is shown in cross section. Two workpieces 5, 7 to be joined are contoured so as to provide a groove when abutted at interface 9, the groove having sloped sidewalls 11, 13 and a flat bottom formed by complimentary surfaces 15, 17. The top of the groove has a width A-D; and the bottom a width E-B. Point C is a midpoint between points E and B and may or may not coincide with interface 9. In some applications, the bottom of the weld groove may be formed by an insert (not shown) interposed between parts 5 and 7 rather than surfaces 15 and 17.

Prior to any welding operation, certain parameters are set into the control circuit for the purposes described below. Typical parameters relate to: the welding currents; a high, low, and intermediate control value of arc voltage; a setting proportional to the A-D weld groove width; a setting proportional to the spacing during welding; and the rate of torch oscillation.

Fully automatic welding of a joint of this type is initiated by energizing the power circuit to the welding electrode and a controlling programmer, and initiating movement of the workpiece with respect to the torch. The torch may be an assembly movable with respect to the work, or the work may move past a relatively fixed torch. The torch is positioned just to the left of point A (FIG. 2) and, because the arc voltage prior to striking an arc is in excess of a set high value, the torch is automatically driven toward the work until an arc is struck. The torch then is quickly and automatically raised to a position corresponding to the preset intermediate arc voltage value.

At this point the automatic horizontal control system is automatically activated causing the torch to be moved horizontally across the weld groove. The automatic vertical control at all times adjusts the torch-to-work distances to maintain the arc voltage in a range between the preset "high" and "intermediate" value. When the high value is reached, the torch is immediately driven down to a position where the intermediate voltage value is achieved. This causes the torch to move down along wall 11 and across the surfaces 15, 17 while approximately maintaining the preset spacing.

When the torch is above about point B, the vertical control receives its first "Up" signal because the arc voltage reaches the preset low value. This signal automatically activates an automatic oscillator-control system, causing the tip of the weld torch to swing toward wall 13 only an amount necessary to ensure weld tie-in with this wall and then the torch is oscillated toward wall 11. This movement is determined by a preset oscillation width control of the automatic oscillation control system such as counting a predetermined number of fixed frequency clock pulses beginning each time the torch tip passes a reference position. In the preferred embodiment described below, all controls are referred from a vertical torch tip position taken as the reference position. It will be understood throughout the specification that reference to vertical positioning of the torch tip refers to the positioning of the torch tip in a direction perpendicular to the weld groove path which may not be an actual vertical orientation, as in the case of welding together sections of vertically mounted piping.

In order to prevent the torch tip from stubbing the weld groove wall or to compensate for any alignment irregularity as the torch is oscillated back and forth over the weld path, the automatic oscillator control includes an inhibit signal generator which is responsive to a preset arc voltage value to generate an inhibit signal to stop the oscillator drive when the torch tip is driven too close to the weld groove wall. This inhibit condition exists until the oscillator drive is reversed to oscillate toward the opposite wall. Thus, the torch continues to oscillate over the weld path as it is moved along the path. Thereafter, the automatic vertical control raises the torch as required to accommodate filling of the weld groove with filler metal or fused material from the base metal, and the oscillator control system compensates for any horizontal displacements of the walls of the groove as the torch moves along the groove. As the groove is filled and the torch reaches the level indicating a complete weld, portions of the system are inactivated by the programmer; and, when the torch is vertically oriented above the weld path, the remaining portion of the system becomes inactivated and the weld is complete.

Figure 1:
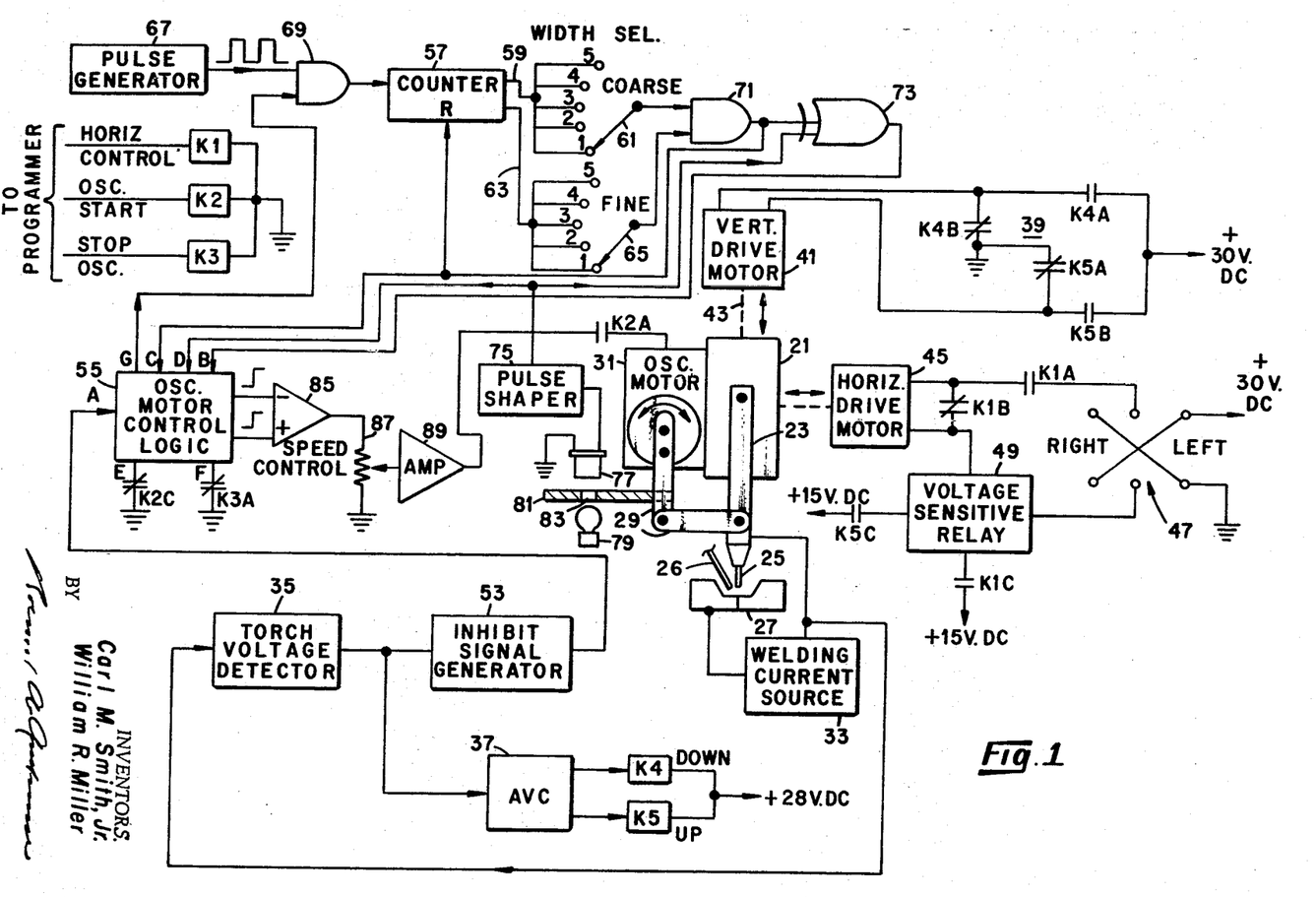
FIG. 1 is a schematic block diagram of a self-adaptive control circuit for automatically controlling the oscillatory movement and torch-to-work spacing of a program controlled welding device.

Referring now to FIG. 1, there is shown a preferred embodiment for providing self-adaptive control of the motion of an arc welding torch relative to the weld groove in accordance with the above-described welding cycle. The welding head assembly 21 is illustrated schematically. Typically, this assembly includes a welding torch or gun 23 which in this case is pivotally connected to the welding head assembly 21. The torch or gun 23 is provided with an electrode 25. A consumable filler wire 26 may be automatically fed into an arc between electrode 25 and a workpiece 27 by conventional means, not shown, or by other similar means in response to the voltage between the torch tip and the workpiece 27 as described in U.S. Pat. No. 3,341,686, referenced above.

The lower end of the torch tip 23 is connected for horizontal oscillatory motion by means of mechanical links 29 to a reversible DC motor 31 attached to the welding head 21. A welding current source 33 is connected between the electrode 25 and the workpiece 27 in a conventional manner to provide a welding arc between the end of the electrode 25 and the workpiece 27. The control system responds to the voltage of an arc between the welding electrode and the workpiece, which voltage is applied to the input of a torch (arc) voltage detector 35 including a signal conditioning amplifier which provides an analog output signal proportional to the torch-to-work spacing.

The output of detector 35 is connected to the input of an automatic vertical control circuit (AVC) 37, the function of which will be explained in detail hereinbelow. Briefly, the AVC circuit maintains the vertical position of electrode 25 above the workpiece 27 within selected upper and lower limits in accordance with the feedback arc voltage from detector 35. The first output of the AVC which is activated when the arc voltage exceeds a preset high value, is connected to a relay K4 which drives the assembly down by activating relay K4. The second output of the AVC, which is activated when the arc voltage drops below a preset low value, is connected to relay K5 which drives the assembly up by activating relay K5. The contacts of relays K4 and K5 are connected in a conventional control circuit 39 (contacts shown in the deenergized position) so that when relay K4 is energized the voltage source is supplied to a vertical drive motor 41 in a polarity to move the assembly 21 down by means of conventional mechanical linkage 43 and when relay K5 is energized the polarity is reversed to motor 41 so as to move the assembly 21 up. The contacts are arranged so that when the relays are deenergized the motor 41 terminals are shorted so as to provide braking following a correction movement. Thus, it will be seen that the vertical torch-to-work spacing is automatically controlled within preset high and low limits in response to the welding arc voltage.

The welding head assembly is moved into position over a weld groove such as that shown in workpiece 27 by means of a horizontal drive motor 45 which is mechanically coupled to the welding head assembly 21. The direction in which the horizontal drive motor will move the assembly 21 depends upon the position of a double-pole double-throw switch 47. When the switch 47 is thrown for the desired direction of horizontal travel of the head assembly 21 towards the weld groove, the action is started by actuating relay K1 from a programmer unit (not shown) which closes contact K1A applying the 30 V. DC source to motor 45 and simultaneously opening the motor braking contact K1B. In order to stop the horizontal drive motor 45 when the torch tip 25 is located over the weld groove, a voltage sensitive relay 49 is provided which has a set of normally closed contacts connected in series with the supply leads to motor 45. Relay 49 is enabled by the closing of contacts K1C of horizontal control relay K1 which connects a +15 v. DC supply to the enabling input of relay 49. The actuating input of relay 49 is also connected to the +15-volt supply by means of a set of normally open contacts K5C of the Up control relay K5. Therefore, once the horizontal drive motor 45 places the head assembly 21 in motion, the horizontal travel of the assembly 21 continues to the location of the weld groove. Down signals from the AVC circuit 37 cause the torch to follow the groove wall and across the flat bottom surface. When the opposite wall face is encountered, the AVC circuit 37 will call for Up motion by energizing relay K5 to close contacts K5C and, in turn, actuating relay 49 to stop the horizontal drive motor 45. It will be noted at this point that it is necessary for the arc to have been struck prior to the activation of the horizontal drive motor 45, as will be explained in the discussion of the operation below.

The output of the torch voltage detector 35 is also connected to the input of an inhibit signal generator 53. This circuit includes a conventional comparator circuit whose output changes states when the analog voltage from detector 35 drops below a preset level so as to generate an inhibit signal at this point. The logic signal generated at the output of the comparator is conditioned by a squaring circuit so as to generate a logical (1) signal having a voltage level consistent with the remaining logic circuitry of the control circuit, which those skilled in the art will recognize may be any convenient voltage level between 3 and 5 volts DC.

The output of the inhibit signal generator 53 is connected to a first control input of an oscillator motor control logic circuit 55 which will be explained in detail hereinbelow. Basically, the logic circuit 55 controls the direction (left or right) and width of oscillation of the torch tip 25 in response to the torch voltage signal in conjunction with a width control signal obtained at the output of a binary counter 57. As shown in FIG. 1, the higher order stages of counter 57 are connected by means of a first multiple lead cable 59 to respective terminals of a first selector switch 61 for selecting the coarse count range and the lower order stages of the counter are connected by means of a second multiple lead cable 63 to respective terminals of a second selector switch 65 for selecting the fine count range. The count range selected by switches 61 and 65 controls the width of oscillation of the torch tip. The counter is actuated by a fixed frequency clock pulse generator 67 which has its output connected to one input of AND-gate 69, the other input of which is connected to an output G of logic circuit 55. The output of AND-gate 69 is connected to the trigger input of counter 57 so that when AND-gate 69 is enabled by the application of a 1 from logic circuit 55 and the pulses are fed to counter 57 and registered therein. Once the counter reaches the selected count, a logical 1 will be applied to each of the leads connected to the selector arms of the respective switches 61 and 65, thereby enabling AND-gate 71 to apply a 1 to a first input of an Exclusive OR gate 73. The second input of gate 73 is connected to the output of a pulse shaper 75 which shapes the pulse from a photodetector 77 into a proper logic pulse to be applied to gate 73 and to a control input D of logic circuit 55. When the photodetector is activated by light from a lamp 79 passing through a baffle 81 connected for horizontal movement with torch tip oscillating linkage 29, the photodetector output pulse is shaped into a square wave pulse consistent with the system logic level. The baffle has an opening 83 through which the light beam passes each time the torch tip moves into the vertical position, centered over the weld path.

The output of Exclusive OR gate 73 is connected to a control input B of logic circuit 55 and the output of AND-gate 71 is connected to control input C of logic circuit 55 and to the reset input (R) of counter 57, whereby the counter is reset once it has registered the particular count selected by switches 61 and 65.

The oscillator motor control logic circuit 55 has a first output connected to the inverting input of an operational amplifier 85 and a second output connected to the noninverting input of amplifier 85 and a second output connected to the noninverting input of amplifier 85 for controlling the running direction of oscillator motor 31. The output of amplifier 85 is connected to a speed control potentiometer 87 which has the adjustable arm thereof connected to the input of a power amplifier 89, whereby the oscillating rate of the torch tip is set. The output of amplifier 89 is connected to oscillator motor 31 through a set of normally open contacts (K2A) of an oscillator starting relay K2 which is controlled in a conventional manner by the welding programmer (not shown).

Figure 3:
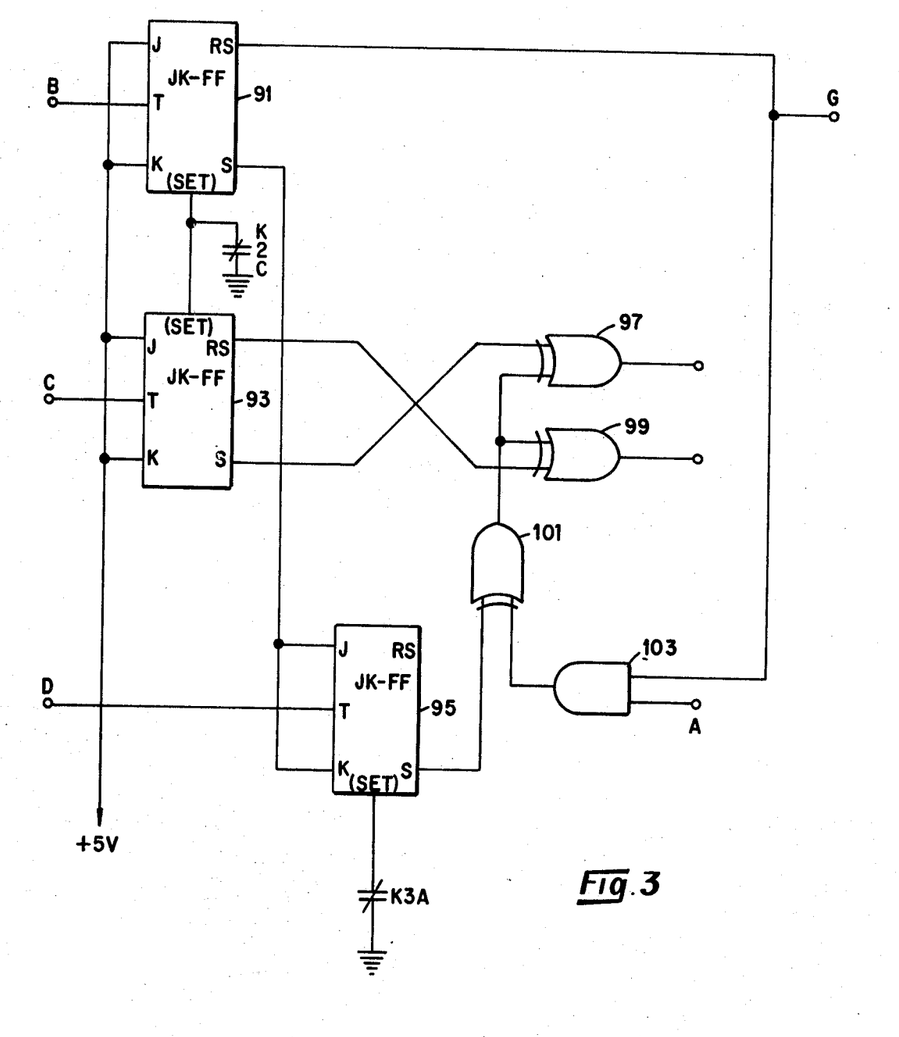
FIG. 3 is a schematic diagram of the oscillator motor control logic shown in block form in FIG. 1.

Referring now to FIG. 3, the oscillator motor control logic 55 will be explained in detail. As shown, the control logic consists primarily of three conventional J-K flip-flops 91, 93 and 95. As is well known by those skilled in the art, a J-K flip-flop has two qualifying inputs (J and K) which must be activated at the 1 level before the device will change states by applying a 1 to the trigger input (T). The direct set inputs of both flip-flops 91 and 93 are connected to ground (0) by means of normally closed contacts K2C of the oscillator starting relay K2; and the direct set input of flip-flop 95 is connected to ground (0) by means of normally closed contacts K3A of the oscillator stop relay K3. By applying a 0 (K2C and K3A closed) to the direct set inputs, the flip-flops are held in the reset state, output (RS) remaining high (logical 1), until the ground is removed and a pulse is applied to the trigger input (T) to set the flip-flops.

Both the J and K inputs of flip-flops 91 and 93 are connected in common to the +5-volt DC supply. The trigger input (T) of flip-flop 91 is connected to input terminal B which is connected to the output of Exclusive OR gate 73 (FIG. 1.). The trigger input (T) of flip-flop 93 is connected to input terminal C which is connected to the output of AND-gate 71 (FIG. 1). The reset output (RS) of flip-flop 91 is connected to output terminal G which is connected to an input of AND-gate 69 and thereby enables gate 69 to pass the count pulses to the counter 57 when flip-flop 91 is in the reset state, RS output high.

Each time the counter 57 registers the selected number of pulses, a 1 is applied directly to the trigger input T of flip-flop 93 causing it to change stages and indirectly through Exclusive OR gate 73 to the trigger input of flip-flop 91 so that both flip-flops change states. By changing the state of flip-flop 93, the direction of rotation of the oscillator drive motor 31 is reversed; and, by changing the state of flip-flop 91, the pulses from the pulse generator 67 are blocked from the counter by removing the 1 applied to AND-gate 69 from the RS output of flip-flop 91.

As shown in FIG. 3, the S and RS outputs of flip-flop 93 are connected, respectively, to the first inputs of a pair of Exclusive OR gates 97 and 99. The output of OR-gate 97 is connected to the inverting input (−) of operational amplifier 85 (FIG. 1) while the output of OR-gate 99 is connected to the noninverting input (+) of amplifier 85.

The purpose of flip-flop 95 is to stop the torch in the center of its oscillating path or in the vertical position as referred to hereinabove, when the weld pass is completed, thus properly positioning the weld torch for the horizontal scan at the beginning of the next weld pass. The set output (S) of flip-flop 91 is connected to both the J and K inputs of flip-flop 95 so that it is enabled only when flip-flop 91 is in the set state. The trigger input (T) of flip-flop 95 is connected to terminal D which is, in turn, connected to the photodetector pulse shaper 75 (FIG. 1). The set output (S) of flip-flop 95 is connected to a first input of an Exclusive OR gate 101. The output of gate 101 is connected to the second inputs of both Exclusive OR gates 97 and 99, and depending upon the level of the output of gate 101, gates 97 and 99 will be enabled or inhibited as will be explained hereinbelow.

If the electrode 25 of the torch 21 comes too close to the wall of the weld groove, an inhibit signal will be generated at the output of inhibit generator 53. This signal is applied to input A of AND gate 103, whose second input is connected to the RS output of flip-flop 91. This input signal combination produces an output from gate 103 when the torch is being driven toward the wall of the weld groove and when the inhibit limit setting has been exceeded.

The output of gate 103 is connected to the first input of Exclusive OR gate 101, and the second input is connected to the S output of flip-flop 95. A signal from either of these sources will cause a high output from gate 101 to inhibit both direction gates 97 and 99, thereby stopping the oscillator motor 31.

When the weld pass is completed, a weld finish stop sequence is initiated, by the programmer, by energizing relay K3 thus causing contact K3A to open. Flip-flop 95 is now capable of changing states when a pulse is received from the photodetector via input D as the torch reaches the vertical position. As described in the above paragraph, a signal from the S output of flip-flop 95 causes an output from gate 101 to inhibit both direction gates 97 and 99 thereby causing the motor 31 to stop; in this case, to stop in the vertical position.

Figure 4:
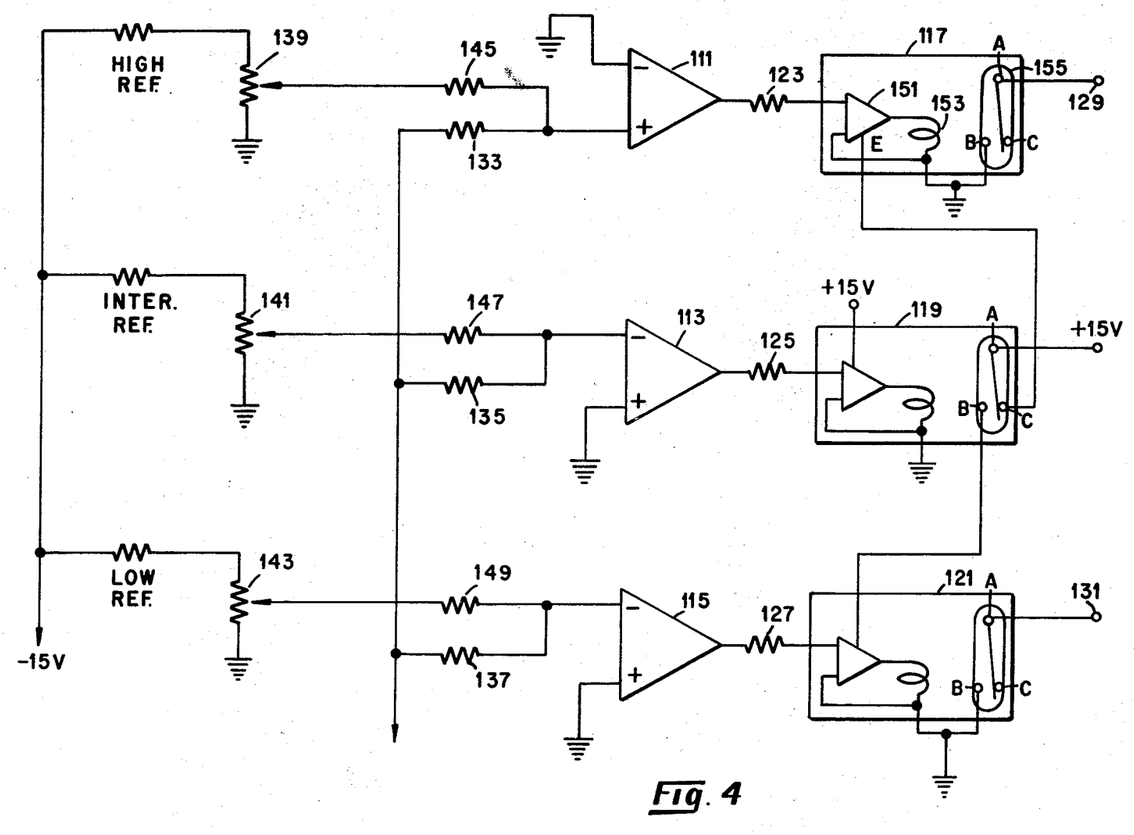
FIG. 4 is a schematic diagram of the AVC circuit shown in block form in FIG. 1.

Referring now to FIG. 4, there is shown a schematic diagram of the AVC circuit 37 (FIG. 1). This circuit consists primarily of three operational amplifiers 111, 113 and 115 which have their outputs connected to corresponding voltage-sensitive relays 117, 119 and 121 through resistors 123, 125 and 127, respectively. The output terminal 129 from relay 117 is connected to the Down control relay K4 (FIG. 1) and the output terminal 131 from relay 121 is connected to the Up control relay K5 (FIG. 1). The noninverting (+) input of amplifier 111 and the inverting inputs (−) of amplifiers 113 and 115 are connected by means of resistors 133, 135 and 137, respectively, to the output of the torch voltage detector 35 (FIG. 1) and to the adjustable arms of reference voltage potentiometers 139, 141 and 143 by means of resistors 145, 147 and 149, respectively. Each of the potentiometers 139 through 143 are connected between a −15-volt supply and ground potential, whereby the high, intermediate and low reference arc voltages may be separately adjusted as necessary for the particular welding application so as to control the torch-to-work spacing in response to the arc voltage.

Each of the voltage sensitive relays 117 through 121, and relay 49 of FIG. 1, are conventional voltage sensitive relays, such as the "Sensitac" Model 17C2 or 16C2 supplied by Struthers-Dunn, Inc., Pittman, New Jersey. Referring to relay 117 (FIG. 4), for example, it will be seen that each relay includes an amplifier 151 connected to the ungrounded side of the relay energizing coil 153 which has one set of SPDT contacts 155 (terminals A, B and C) shown in their normal or deenergized position. The amplifiers of relays 49, 117 and 121 (Type 17C2) have an enabling input E which must be energized before a signal applied to the input will energize the relay; and once energized it will remain locked-in until the enabling voltage is removed. Relay 119 is of the Model 16C2 type and differs in that it has a fixed voltage applied rather than the enabling lock-in feature and, therefore, it is controlled by the input signal to its relay amplifier. As will be readily seen by referring to FIG. 4, the terminals A–B of contacts 155 are normally open and terminals A–C normally closed. Thus, the +15 V. supply is connected to the A terminal of relay 119, through terminals A–C to input E of relay 117, and through terminals A–B to the input E of relay 121. Terminal A of relay 117 is connected to the Down control relay K4 (FIG. 1) and terminal A of relay 121 is connected to the Up control relay K5 (FIG. 1). Terminals B of both relays 117 and 121 are connected to ground to complete the relaying arrangement.

In operation, the AVC circuit controls the torch-to-workpiece spacing within predetermined high and low limits, determined by the particular value settings of potentiometers 139 and 143, respectively. If the arc voltage reaches either of these limits, the torch is driven Up or Down, in a corrective direction until the position corresponds to the intermediate reference setting as selected by potentiometer 141. This setting may be any value between the high and low settings. For example, assume that the arc voltage drops below the reference voltage setting of the low reference potentiometer, indicating that the torch is too close to the workpiece. Since the analog voltage at the output of the torch voltage detector is positive and the reference voltage is negative, the difference signal at the inverting input of amplifier 115 will become negative causing the output to go positive which actuates relay 121. This activates relay K5 causing the vertical drive motor to move the welding head assembly up. It will be noted here that since relay 119 and amplifier 113 are connected in the same manner as amplifier 115 and relay 121, relay 119 will have been energized before the output of amplifier 115 goes positive to energize relay 121 and thus the enabling voltage is applied to relay 121 through the closing of terminals A–B of relay 119. As pointed out above, relay 121 will remain energized until the enabling voltage to input E is removed (when relay 119 drops out). However, relay 119 remains energized until the torch is moved up to a point equal to the intermediate reference setting.

Figure 5:
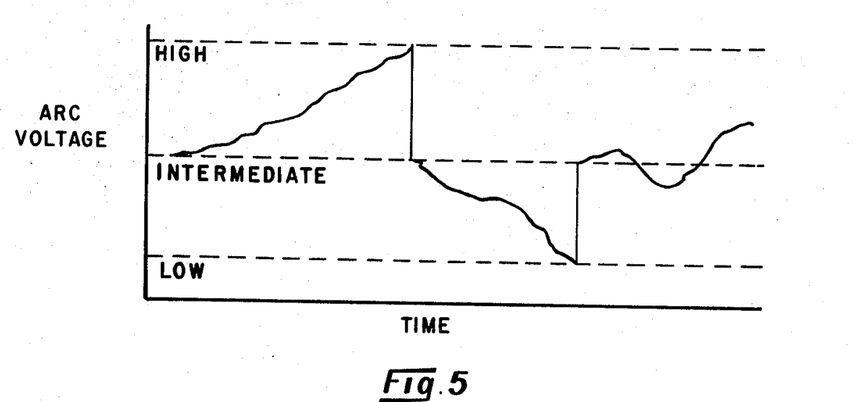
FIG. 5 is graphic illustration of the effect of repositioning the torch-to-work spacing when preset arc voltages are exceeded.

The down control relay 117 operates in the same manner except the polarities are reversed since the difference signal between the high reference setting and the analog feedback signal from the torch voltage detector 35 is applied to the noninverting input of operational amplifier 111. In this case, the torch tip is driven down until the intermediate reference point is reached, thereby picking up relay 119 and removing the enabling signal from relay 117. As shown in FIG. 5, it will be seen that each time a correction is made, the torch is moved to the intermediate set point. A typical trace of arc voltage as a function of time is shown in FIG. 5 and illustrates the adjustment of the torch to achieve the intermediate reference arc voltage.

Referring again to FIGS. 1 and 2, the operation of the device will be explained in detail. Fully automatic welding of a joint of the type shown in FIG. 2 is initiated by energizing the power circuit to the welding current source 33 and the controlling program (not shown) and initiating movement of the workpiece K5C. respect to the torch. The torch may be on a carriage movable with respect to the work, or the work may move past a relatively fixed torch. The torch may be positioned just to the left of point A (FIG. 2) and, since the arc voltage prior to striking an arc is in excess of the set high value, the torch is automatically driven down toward the workpiece until an arc is struck. The torch is then quickly and automatically raised to the position corresponding to the present intermediate arc voltage value in the AVC. At this point switch 47 is closed to the drive right position and the horizontal control relay K1 is operated by command from the programmer. This closes contact K1A and opens shorting or braking contacts K1B, thereby applying the +30 v. DC to the horizontal drive motor 45, causing it to move the welding head assembly to the right so that the torch is moved horizontally across the weld groove. At the same time, contacts K1C are closed enabling relay 49 to be operated the next time the Up control relay K5 is picked up, closing contacts KSC. The torch tip continues to move across the weld groove while at the same time being under control of the AVC circuit to move the torch down along wall 11 and then across and above surfaces 15 and 17. When the torch reaches a position just above point B, the arc voltage will begin to drop since the torch tip is approaching wall 13, and when the lower reference setting is reached, relay K5 is energized to pull the torch up to a position corresponding to the preset intermediate arc voltage value. At this point contact K5C closes, operating relay 49 which, in turn, opens the circuit of the horizontal drive motor 45, stopping the welding torch approximately over point B of the groove.

Once these initial position steps have been carried out and the desired weld path width has been selected by means of the width selector switches 61 and 65, the programmer actuates the oscillator start relay K2 which closes contacts K2A applying the output of amplifier 89 to the oscillator drive motor 31. At the same time, contacts K2C are opened and, since flip-flops 91 and 93 (FIG. 3) have been held in the reset state by means of the ground signal on the set inputs thereof, the RS outputs of both flip-flops are at the logical 1 level. This enables AND-gate 69 to pass the pulses from pulse generator 67 to the counter 57. During this time period the oscillator motor 31 has been driving in one direction, say to the left, because the set action of contact K2C left flip-flop 93 with output RS at logical 1.

Since there is no inhibit signal present at the input A of AND-gate 103 (FIG. 3) from the inhibit signal generator, there is no output from gate 103. Since contact K3A is closed, the S output of flip-flop 95 is at logical 0 level. Thus, with both inputs low, the output of Exclusive OR gate 101 is at the 0 level. With one input of Exclusive OR gate 99 at the 1 level, the output will be at logical 1 level which applies a drive left signal to motor 31 through amplifiers 85 and 89.

At the conclusion of the selected count, the counter 57 will apply a 1 to both inputs of AND-gate 71, thus producing a 1 at the output of gate 71 which is amplified to the trigger input (T) of flip-flop 93, reversing its state. The S output of flip-flop 93 switches to the logical 1 level and thereby reverses the direction of the oscillator motor drive. The 1 at the output of gate 71 is also applied to the reset input of counter 57 and to one input of Exclusive OR gate 73 to produce a 1 at the output of gate 73 which is applied to the trigger input of flip-flop 91, reversing its output, thereby removing the 1 at the RS output thereof. This action disables gate 69 so no clock pulses can be counted and disables gate 103 so an inhibit cannot occur. The motor is now free running to the right and the torch tip has not passed the vertical position.

When the vertical position is reached a pulse is generated by the photodetector 77 and is squared by the pulse shaper 75. This pulse is applied to one input of Exclusive OR gate 73 which causes its output to go to the 1 level. The output of gate 73 is then applied to the trigger input of flip-flop 91 which causes it to reset (RS output 1 level). Gate 69 is again enabled and the clock pulses are again counted by counter 57.

Since AND-gate 103 is again enabled, an inhibit signal at this time from the inhibit signal generator 53 will cause the output of gate 103 to go to the 1 level. Since contacts K3A are still closed and flip-flop 95 is still reset (S at 0 level), only one input to Exclusive OR gate 101 will be at the 1 level, therefore, the output will be at the 1 level which, in turn, disables the Exclusive OR gates 97 and 99. Thus, the oscillator motor stops and an inhibit condition exists because the torch voltage has decreased indicating that the torch tip is too close to the wall of the weld groove.

At the conclusion of the count, gate 71 is again enabled which, in turn, reverses the oscillator motor direction signal from flip-flop 93. Enabling gate 71 also enables gate 73 which reverses flip-flop 91 to remove the enabling signal from AND-gate 103. This action reverses the inhibit action of gate 101, thus permitting the motor 31 to drive the torch to the left away from the groove wall. Gate 69 is again disabled and no counting action takes place. The motor is now free running until it again passes the vertical reference position.

At this moment the S output of flip-flop 91 is at the 1 level which enables the J and K inputs of flip-flop 95. A stop command from the programmer at this time will cause the K3A contacts of oscillator stop relay K3 to open. When the torch passes the vertical position, the pulse from the photodetector pulse shaper 75 will be applied to the trigger input, thereby setting flip-flop 95 and applying a signal to one input of gate 101.

Since the motor is driving the torch away from the groove wall, no inhibit signal can exist at this moment. With one input high and one input low, the output of gate 101 is high. This condition causes gates 97 and 99 to be inhibited and the motor stops. This condition is maintained until both contacts K3A and K2C are again closed by the programmer to reset all functions to the starting condition.

Accordingly, it will be seen that the oscillator motor control logic 55 keeps the torch within a prescribed weld path as the programmer moves the welding head assembly along the groove path by means, not shown, and insures weld tie-in to at least one wall of the groove on the first path over the weld groove. Thereafter, the AVC raises the torch as required to accommodate filling of the weld groove with filler metal, or fused material from the base metal, as the welding head assembly makes a programmed number of weld passes over the weld groove to accommodate filling of the weld groove in a conventional manner. As the groove is filled and the torch reaches the level indicating a complete weld, the programmer energizes the oscillator stop relay K3 and, when the torch is vertically oriented the oscillator motor 31 is stopped as described above and the remaining portions of the system controlled by the programmer become inactive and the weld is completed.

It should be noted here that it is not necessary for the torch to oscillate back and forth over the complete width of the weld groove on each weld path pass. For example, when welds are to be made in thick sections, the groove may be filled by a number of partially overlapping weld passes. The inhibit feature of the control circuit insures weld tie-in with at least one of the wall sections to give complete weld groove filling.

Throughout the foregoing description of the subject invention, a portion of the welding control system utilizes a signal proportional to the arc voltage. This should not be construed as a limitation because other signals proportional to the spacing between the work and the electrode of the torch may be used. For example, known spacing gage principles such as electromagnetic gages, capacitance gages or infrared responsive gages would accurately measure the spacing and thus supply the necessary signal to the control circuitry. Accordingly, the control system would be adaptable to nonelectric welding applications, as well as the tungsten electrode gas-arc welding described above.

Contour welding, where known horizontal displacements are involved, can be accomplished using this invention. A template may be used for general guidance of the torch, and the adaptive circuitry described herein would provide the intricate guidance. Consequently, all types of welding may be automatically performed with resultant welds of high integrity.

What is claimed is:

1. In combination with a programmed welding system wherein the position of a welding torch relative to the workpiece is controlled in response to a signal proportional to the torch-to-workpiece spacing as said torch is moved along a weld groove path and which system has oscillation means for transversely oscillating said torch over said weld path including an oscillator drive means mounted with an assembly for carrying said torch, a vertical drive means and a horizontal drive means for positioning said assembly with respect to said workpiece weld groove path, the improvement for providing automatic, self-adaptive control of the motion of said torch over said weld groove path, said improvement comprising:

means for sensing the torch-to-workpiece spacing and providing a signal at an output thereof proportional to said spacing;

a vertical control means connected to the output of said sensing means for controlling said vertical drive means in response to said signal output from said sensing means, thereby automatically controlling the torch-to-workpiece spacing within preselected upper and lower limits and returning said torch to a preset intermediate position when said upper and lower limits are reached;

a horizontal control means for controlling said horizontal drive means so as to position said torch over said weld groove;

an oscillator control means connected to said oscillator drive means for selectively controlling the width of oscillation of said torch; and an inhibit signal generator having an input connected to the output of said sensing means and an output connected to said oscillator control means for inhibiting the width of oscillation of said torch within said selected width in response to a predetermined signal level at the output of said sensing means, whereby when said torch is oscillated too close to a wall of said weld groove said torch is stopped short of the selected width of oscillation over said weld groove each time an inhibit signal is generated.

2. The improved welding control system as set forth in claim 1 wherein said oscillator control means includes:

a clock pulse generator for generating fixed period clock pulses at an output thereof;

a first gating means having first and second inputs and an output, said first input connected to the output of said clock pulse generator;

a counter connected to the output of said first gating means for counting said clock pulses when said first gating means is enabled to pass said pulses to said counter by the application of a signal to the second input thereof, said counter having means connected to the respective counting stages of said counter for providing an output signal at an output thereof when a selected number of clock pulses are registered by said counter;

a logic control circuit having first, second, and third inputs and first, second, and third outputs, said first and second outputs for controlling said oscillator drive means so that when said first output is activated said torch is displaced in a forward direction and when said second output is activated said torch is displaced in the reverse direction, and said third output connected to said second input of said first gating means;

circuit means for connecting said first and second outputs of said logic control circuit to said oscillator drive means;

a second gating means connected between the output of said counter and said second input of said logic circuit for switching the direction of displacement of said torch each time said selected number of pulses is registered by said counter;

a first Exclusive OR gate having first and second inputs and an output, said first input of said first Exclusive OR gate connected to the output of said second gating means and said output connected to said third input of said control logic circuit; and detecting means for producing a switching signal at an output thereof as an incident of each oscillatory crossing of said torch over the center of said weld path, said output connected to said second input of said first Exclusive OR gate, thereby activating said third output of said logic circuit to enable said first gating means each time said switching signal is generated, said first gating means remaining enabled until disabled by said logic circuit each time said selected number of pulses is registered by said counter.

3. The improved welding control system as set forth in claim 2 wherein said control logic circuit includes a first flip-flop connected to receive at an input thereof the output of said second gating means and having first and second outputs of different voltage levels and adapted to alternately apply said output voltages to said outputs thereof each time a pulse from said second gating means is applied to the input thereof;

a third and fourth gating means each having a first input connected for receiving said inhibit signal generated by said inhibit signal generator and a second input connected to respective outputs of said first flip-flop for gating said output voltages from said first flip-flop to said first and second outputs, respectively, of said logic control circuit;

a second flip-flop connected to receive at an input thereof the output of said first Exclusive OR gate and having first and second outputs of different voltage levels and adapted to alternately apply said output voltages to said outputs thereof each time a pulse from said first Exclusive OR gate is applied to the input thereof, said first output of said second flip-flop connected to said enabling input of said first gating means.

4. The improved welding control system as set forth in claim 3 wherein said control logic circuit further includes an AND gate having first and second inputs and an output, said first input connected to said first output of said second flip-flop and said second input connected to the output of said inhibit signal generator; and a second Exclusive OR gate having first and second inputs and an output, said first input connected to the output of said AND gate and said output connected to the first inputs of said third and fourth gating means.

5. The improved welding control system as set forth in claim 4 further including oscillator drive stopping means responsive to the output of said detecting means for applying a signal to said second input of said second Exclusive OR gate upon the application of a pulse from said detecting means following the application of a stop signal to an input thereof, thereby stopping said torch in a reference position relative to said weld path.

6. The improved welding control system as set forth in claim 5 wherein said circuit means for connecting said first and second outputs of said logic control circuit to said oscillator drive means includes:

an operational amplifier having an inverting and noninverting input and an output adapted for inverting the polarity of a signal applied to said inverting input at the output thereof and maintaining the same polarity of a signal applied to the noninverting input at the output thereof, said inverting input connected to the output of said third gating means and said noninverting input connected to the output of said fourth gating means, whereby when said third gating means is activated said oscillator drive means is driven in said forward direction and when said fourth gating means is activated said oscillator drive means is driven in said reverse direction;

a power amplifier having an input and an output, said output connected to said oscillator drive means; and a potentiometer connected to the output of said operational amplifier and having the adjustable arm thereof connected to the input of said power amplifier for selectively controlling the speed of said oscillator drive means.

7. The improved welding control system as set forth in claim 6 wherein said oscillator drive means is a reversible DC motor and said welding torch is pivotally mounted on said torch-carrying assembly and adapted to be transversely oscillated over said weld path by mechanical linkage means responsive to the alternate forward and reverse driving of said motor.

8. The improved welding control means as set forth in claim 7 wherein said detector means for providing a switching signal each time said torch passes said weld path center position includes:

a baffle having an opening therethrough coupled to said mechanical linkage means for imparting reciprocating motion thereto with the oscillation of said torch;

a light source;

a photodetector cell mounted in a fixed position relative to said torch-carrying assembly so as to provide an output signal when energized by light passing from said light source through said opening in said baffle when said torch is in said reference position, centered over said weld path and a pulse shaper having an input and an output, said input connected to the output of said photodetector and said output connected to the second input of said first Exclusive OR gate and said oscillator drive stopping means.

* * * * *